United States Patent Office 3,452,120
Patented June 24, 1969

3,452,120
BLENDING SOLID OLEFIN POLYMERS WITH RUBBER
Philip M. Arnold, Bartlesville, Okla., assignor to Phillips Petroleum Company, a corporation of Delaware
No Drawing. Filed May 21, 1964, Ser. No. 369,282
Int. Cl. C09d *9/08;* B01f *3/18*
U.S. Cl. 260—889    11 Claims

ABSTRACT OF THE DISCLOSURE

A blend of a rubbery polymer and a polyolefin polymer is prepared by milling the rubbery polymer with a polyolefin having a particle size of less than 150 microns at a temperature below the melting point of the polyolefin.

---

This invention relates to the blending of solid olefin polymers with rubber.

Polyolefin-rubber blends are well known, and various techniques have been devised in attempts to obtain blends with better processability and/or improved properties. However, in all instances that I know, either pelletized or coarsely-ground polyolefin was used in the preparation of the blends because it was thought that—since the blending or mastication of the rubber with the polyolefin would melt the polyolefin—the initial degree of subdivision of the polyolefin would not have any effect on the properties of the finished blend. However, microscopic examination of blends prepared using the pelletized or coarsely-ground polyolefin showed that the polyolefin was in the form of small globules dispersed in the rubber—i.e., good dispersion of the polyolefin in the rubber was not obtained. It could be reasoned that by extensive milling, masticating, or similar procedures, it might be possible to disperse polyolefin very thoroughly in rubber. However, there are at least two reasons why this would not be practical: (a) extensive mechanical working tends to break down the rubber molecules and changes the properties of the rubber, and (b) considerable power is consumed in doing such mechanical work, which would make the cost of such a blend—assuming that the desirable properties could somehow be retained—prohibitive.

An object of my invention is to provide an improved process of blending solid olefin polymers with rubber. A further object of the invention is to provide a process wherein the amount of energy used in incorporating said olefin polymers in rubber is reduced when compared to prior art methods. A further object is to provide new compositions comprising rubber and a solid olefin polymer. Other objects and adavntages of my invention will be apparent to those skilled in the art upon reading this disclosure.

I have discovered that the particle size of the polyolefin is extremely important in obtaining a good blend. Previously, it has been felt necessary to blend the materials at a temperature above the melting point of the polyolefin. Using my process, the blending can be accomplished at temperatures far below the melting point of the polyolefin.

For this invention the polyolefin particles should have a maximum dimension less than 150 microns. There appears to be no minimum particle size; the particles can be as small as it is possible to make them. Excellent results have been obtained with the particles of the olefin polymer having a maximum dimension in the range of 5 to 10 microns.

As stated, the use of the finely divided material permits the use of low incorporation temperatures, those below the melting point of the polymer. The range from room temperature to 150° F. is quite suitable and one of the major advantages of this invention is that such low temperatures can be used.

Rubbery materials employed in the blends of my invention include natural rubber and synthetic rubbery polymers of open-chain conjugated dienes having from four to eight carbon atoms exemplified by 1,3-butadiene; 2,3-dimethyl-1,3-butadiene; and the like, or the rubbery copolymers of these and similar conjugated dienes with each other or with copolymerizable monomeric material containing a single ethylenic linkage, such as styrene, alpha-methylstyrene, methyl acrylate, methyl methacrylate, ethyl acrylate, ethyl methacrylate, 2-vinylpyridine, 2-methyl-5-vinylpyridine or the rubbery polymers or copolymers of such dienes as chloroprene and the like.

Polyolefins employed in the blends of my invention are preferably obtained by polymerizing 1-olefins of maximum chain length of eight carbon atoms. Polymers can be prepared from a single 1-olefin, such as ethylene or propylene, or copolymers can be prepared from two or more 1-olefins such as ethylene and propylene, ethylene and 1-butene, 1-butene and propylene, and the like. Copolymers of one or more of the $C_2$ to $C_8$ 1-olefins with up to 20 percent of a conjugated diene, such as 1,3-butadiene, can also be used. Methods for manufacturing these polymers are described in the second edition of the book Polythene, edited by A. Renfrew and published by Interscience Publishers, Inc., New York, N.Y., in 1960, in chapter 2, pages 11 through 41. Of the various polymers that are applicable, those prepared from ethylene are particularly valuable and are frequently preferred.

Rubbery materials prepared in accordance with the process of this invention are suitable for the many uses where rubber is employed. Compositions prepared with high molecular weight polymers of 1-olefins are applicable for shoe sole stocks and heels, pipes, wire coatings, etc.

The process of my invention is applicable to polyolefin-rubber blends of all compositions, and incorporation of the polyolefin into the rubber can be accomplished by any suitable means of mixing the two solid components such as in a Banbury mixer or a roll mill. The temperature used in mixing the polyolefin and rubber can be that required to obtain efficient dispersion of the polyolefin in the rubber. However, as is demonstrated in the examples, use of finely-divided polyolefin permits the use of low temperatures during blending.

Conventional fillers, extenders, pigments, dyes, antioxidants, etc., can be added to the blends of this invention.

The products of my invention are cured by conventional systems. The curing systems disclosed on pages 388 to 395 of Synthetic Rubber by Whitby, copyright 1954 by John Wiley and Sons, Inc., for butadiene/styrene rubbery copolymers are generally suitable. Metallic oxides, such as zinc oxide, are usually used when polychloroprene is used in the mixture. Organic peroxides such as bis($\alpha,\alpha$-dimethylphenyl)hydroperoxymethane can also be used.

Broadly, the amounts of solid olefin polymers in the final composition can vary over wide limits. Usually the rubber is present in major amount. Compositions have been made with as little as 1 part by weight of solid olefin polymer per 100 parts of rubber. The range of 10 to 30 parts by weight of solid olefin polymer per 100 parts of rubber is most generally used.

A better understanding of my invention can be obtained from the following non-limiting examples in which the polyolefin used was polyethylene and the rubber used was SBR. In each case the following recipe was used:

| | Parts by weight |
|---|---|
| SBR–1500 [1] | 100 |
| Zinc oxide | 3 |
| Stearic acid | 2 |
| Flexamine [2] | 1 |
| Sulfur | 1.75 |
| Santocure [3] | 1.75 |
| Polyethylene | 0 or 20 |

[1] Prepared according to the recipe in ASTM D1419–61T.
[2] A physical mixture of a complex diarylamine-ketone reaction product (65%) and N,N'-diphenyl-p-phenylenediamine (35%).
[3] N-cyclohexyl-2-benzothiazolesulfenamide.

EXAMPLE I

Several different polyethylenes were compounded with SBR rubber to give blends and the physical properties were determined. In each run the blending was done at a temperature below the melting point of the polyethylene. Cold water was circulated through the rolls of the mill so that the stock temperature did not go above 150° F. Each stock was milled 10 minutes, allowed to stand one hour, and remilled for 3 minutes. Data are shown in the following table, all products having been cured 30 minutes at 307° F.

| Run | Polyethylene Density [1] | Polyethylene Particle size | $V_r$ [2] | 300% modulus, p.s.i. [3] | Tensile, p.s.i. [3] | Elongation, percent [3] |
|---|---|---|---|---|---|---|
| 1 | None | None | 0.399 | 215 | 300 | 430 |
| 2 | 0.965 | 5–10 microns | 0.422 | 365 | 430 | 500 |
| 3 | 0.916 | 5–10 microns | 0.387 | 295 | 350 | 500 |
| 4 | 0.915 | 50 mesh | 0.363 | | 235 | 210 |
| 5 | 0.924 | 20 mesh | 0.361 | | 180 | 95 |
| 6 | 0.933 | 50 mesh | 0.399 | | 260 | 120 |
| 7 | 0.955 | 50 mesh | 0.393 | | 215 | 140 |

[1] ASTM D 1505–57T, gm. cc.
[2] Volume fraction of polymer in swollen stock determined according to the method of Kraus, Rubber World, 135, No. 1, 67–73 (1956).
[3] ASTM D 412–61T, Scott Tensile Machine L–6. Tests made at 80° F.

These data show that good results are obtained with the finely divided polyethylene but that the improvement is not dependent on polymer density. No 300% modulus figures are given for the blends using the 20 to 50 mesh polymer because the products broke before reaching 300% elongation. The term "20 mesh" means that all of the material will pass through a 20 mesh (U.S. Sieve) and that most of the particles had a diameter near the maximum, which is about 841 microns. Likewise most of the "50 mesh" material had a diameter of about 297 microns.

EXAMPLE II

An additional series of stocks was made using the milling conditions of Example I (cold) and a second (hot) milling procedure in which the polyethylene and rubber were blended at 300° F. on the roll mill, the other ingredients were added, milling was continued for a total of 10 minutes at 195° F., the mixture was allowed to stand for one hour, and remilled for 3 minutes at 195° F. Results on different blends are shown in the following table, all products for tensile and elongation tests having been cured 30 minutes at 307° F.

| Run | 1 | 2 | 3 | 4 |
|---|---|---|---|---|
| Milling | Cold | Cold | Hot | Cold |
| Polyethylene | None | | | |
| Density | | 0.916 | 0.916 | 0.955 |
| Particle size, (microns) | | 5–10 | 5–10 | [2] 10–35 |
| Extrusion properties [1] (uncured stock): | | | | |
| G./min. at 250° F | 82.5 | 94.0 | 87.0 | 87.5 |
| Garvey die rating | 9 | 9 | 8+ | 5+ |
| Feed rating | 8 | 8 | 8 | 6 |
| Tensile, p.s.i. | 260 | 750 | 735 | 190 |
| Elongation, percent | 400 | 640 | 650 | 150 |

[1] Ind. Eng. Chem. 34, 1309 (1942). A No. ½ Royle Extruder is used with a Garvey die. The die rating is based on 12 for a perfectly formed extruded product, with lower numbers indicating less nearly perfect products. The feed rating is based on 10 for excellent feeding, with lower numbers indicating progressively poorer feeding.
[2] Particles pass through U.S. 10 mesh and are retained on U.S. 35 mesh screen, i.e. from 500 to 2,000 micron diameter.

This example shows that substantially the same results are obtained using either the "cold" or "hot" milling procedure as long as the finely divided polymer is used. Poor results are obtained when the large particle size polymer is used in the "cold" milling procedure.

EXAMPLE III

A composition was made using finely divided polypropylene powder in place of the polyethylene of Example I. A good dispersion was obtained.

As many possible embodiments can be made of this invention without departing from the scope thereof, it is to be understood that all matter herein set forth is to be interpreted as illustrative and not as unduly limiting the invention.

I claim:
1. In the process of mixing a minor amount of a solid polyolefin with a major amount of a rubbery polymeric material selected from the group consisting of natural rubber, synthetic rubbery polymers of at least one open-chain conjugated diene having from four to eight carbon atoms, and synthetic rubbery copolymers of at least one open-chain conjugated diene having from four to eight carbon atoms with at least one copolymerizable monomeric material containing a single ethylenic linkage, the improvement comprising using solid polyolefin particles having a maximum dimension less than 150 microns and incorporating said solid polyolefin particles into the rubbery polymeric material by cold milling at a temperature below the melting point of said solid polyolefin particles.

2. A process in accordance with claim 1 wherein said polyolefin is selected from the group consisting of polymers of at least one 1-olefin having up to eight carbon atoms and copolymers of at least one 1-olefin having up to eight carbon atoms with up to 20 percent of a conjugated diene.

3. A process in accordance with claim 2 wherein said polyolefin is incorporated on the basis of from about 1 to about 30 parts per 100 parts by weight of said rubbery polymeric material.

4. A process in accordance with claim 3 wherein the temperature of incorporation is in the range of about 80° F. to about 150° F.

5. A process in accordance with claim 4 wherein said solid polyolefin particles have a maximum dimension in the range of 5 to 10 microns.

6. A process in accordance with claim 4 wherein said polyolefin is a polymer of ethylene.

7. A process in accordance with claim 4 wherein said polyolefin is polyethylene.

8. A process in accordance with claim 4 wherein said polyolefin is an ethylene/propylene copolymer.

9. A process in accordance with claim 4 wherein said polyolefin is an ethylene/butene-1 copolymer.

10. A process in accordance with claim 4 wherein said polyolefin is polypropylene.

11. In the process of making a compounded butadiene/styrene rubbery polymer product by the incorporation of polyethylene into a butadiene/styrene rubbery polymer, the improvement comprising incorporating into said rubbery polymer by cold milling particles of polyethylene having a particle size of 5 to 10 microns, said incorporating by cold milling taking place at a temperature of 80° F., 20 parts by weight of said polyethylene being used per 100 parts of said rubbery polymer.

References Cited

UNITED STATES PATENTS

| | | | |
|---|---|---|---|
| 3,123,583 | 3/1964 | Howard et al. | 260—889 |
| 3,021,567 | 2/1962 | Ranalli | 260—94.9 |
| 3,044,899 | 7/1962 | Canterino | 260—897 |
| 3,283,036 | 11/1966 | Larson | 260—897 |
| 2,785,143 | 3/1957 | Edgerley | 260—4 |
| 3,002,938 | 10/1961 | Gagne | 260—4 |

FOREIGN PATENTS 936,741    9/1963    Great Britain.

SAMUEL H. BLECH, *Primary Examiner.*

M. J. TULLY, *Assistant Examiner.*

U.S. Cl. X.R.

260—4, 5, 96